Sept. 29, 1964 J. M. LIKET 3,150,538
VEHICLE TRANSMISSION SHIFTING UNIT
Filed Aug. 17, 1962 2 Sheets-Sheet 1
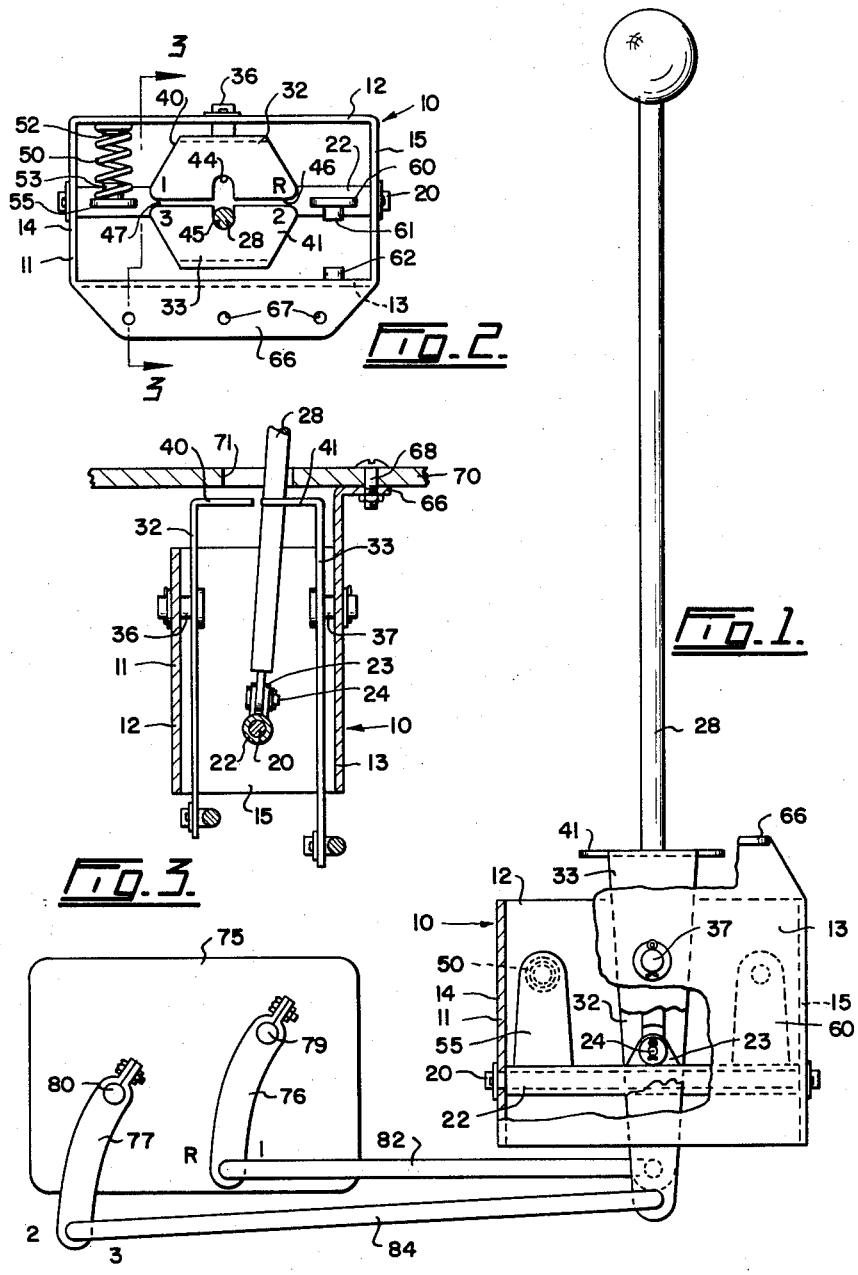
INVENTOR.
JOHANNES M. LIKET
BY
Featherstonhaugh & Co.
ATTORNEYS Sept. 29, 1964 J. M. LIKET 3,150,538
VEHICLE TRANSMISSION SHIFTING UNIT
Filed Aug. 17, 1962 2 Sheets-Sheet 2

INVENTOR.
JOHANNES M. LIKET
BY
*Fetherstonhaugh*
ATTORNEYS

United States Patent Office 3,150,538
Patented Sept. 29, 1964

3,150,538
VEHICLE TRANSMISSION SHIFTING UNIT
Johannes M. Liket, 2725 E. 15th Ave., Vancouver,
British Columbia, Canada
Filed Aug. 17, 1962, Ser. No. 217,708
15 Claims. (Cl. 74—473)

This invention relates to apparatus for quickly and easily shifting the transmissions of motor vehicles, such as automobiles, sport cars and the like.

Many motor vehicles have mechanical transmissions that are shifted into reverse, and first, second and third gears by means of a shift lever located on the transmission at floor level, or on the steering column of the vehicle. Many drivers prefer the positive action of a mechanical transmission, and many of these are looking for a mechanism for shifting the transmission in a much easier and quicker way than is possible with standard shift levers. Some special shifting arrangements have been incorporated in or associated with transmissions for this purpose, but these are very expensive, and it is necessary to substitute the new transmission for the standard transmissions of the vehicles. Some attempts have been made to provide mechanisms for shifting the standard transmissions, but most of the prior arrangements are so complicated they must be assembled at the factory or by skilled workers before being put on the market, and the installation and repairing of these require skilled mechanics.

The shifting apparatus of the present invention is of extremely simple and inexpensive construction, so simple that it can be assembled by practically anyone so that it can be sold as a do-it-yourself kit. It is reliable, has few moving parts and, consequently, very little wear. It may be applied to many makes and years of automobiles without changing their transmissions, and the shifting rods of the vehicle transmission can be used. The unit can be mounted on the floor so that it can be located as close to the driver as desired, and because it is not on the transmission, the shift lever is not subjected to engine vibrations. The construction of the unit is such that the shift lever may be spring loaded for faster and positive shifting from the reverse and first gear side of the unit to the second and third gear side thereof. Different gear shifting arrangements may be produced with this unit with very simple adjustments in the latter. The gear shifting is accomplished easily with a small amount of movement of the shift lever.

A transmission shifting unit according to the present invention comprises a shift lever pivotally mounted for longitudinal and lateral movement, and a pair of lever arms pivotally mounted one on each side of the shift lever for longitudinal movement. Each lever arm has a lower end below its pivot adapted to be operatively connected to a transmission shifter. In the preferred form of the invention, the pivotal mounting of each arm is above the pivotal mounting of the lever. Furthermore, it is preferred to extend each lever arm down below the pivotal mounting of the lever. The unit also includes means for interengaging each arm with the lever for movement therewith when said lever is moved laterally towards the latter arm, said lever disengaging each lever when it is moved towards the other lever.

An example of this invention is illustrated in the accompanying drawings, in which:

FIGURE 1 is a side elevation, partly in section, of a preferred form of shifting unit, diagrammatically showing a vehicle transmission in side elevation;

FIGURE 2 is a plan view of the shifting unit;

FIGURE 3 is a vertical section taken on the line 3—3 of FIGURE 2, showing the unit mounted on a vehicle floor;

Figure 4:
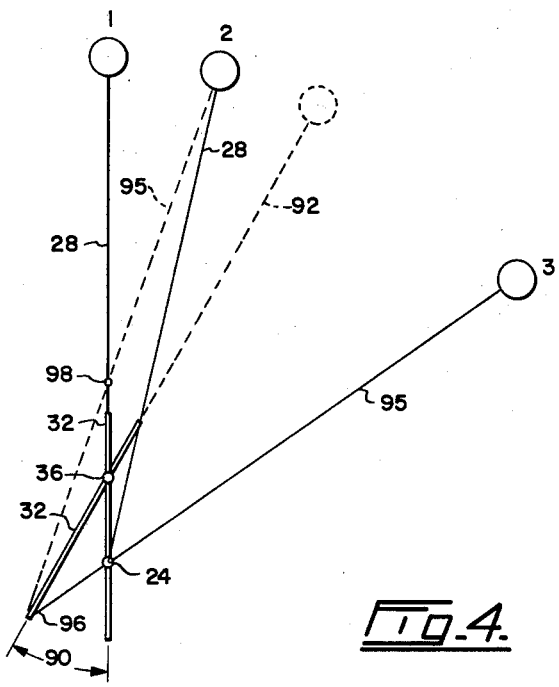
Figure 5:
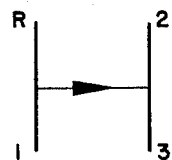
Figure 6:
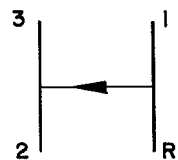

FIGURE 4 is a diagram to illustrate the amount of movement of the shift lever in this unit, and compared to the movement of a standard shift lever in the same arrangement;

FIGURE 5 diagrammatically illustrates the shift arrangement of the unit set up as illustrated in FIGURES 1 to 3; and FIGURE 6 illustrates another shift arrangement which may be attained by a simple adjustment in the illustrated unit.

Referring to the drawings, 10 is a shifting unit according to the present invention. This unit includes a support in the form of a vertical sleeve 11 having side walls 12 and 13, and end walls 14 and 15. A shaft 20 is mounted in end walls 14 and 15, and extends longitudinally of sleeve 11 near the lower end thereof. Another sleeve 22 is rotatably mounted on shaft 20 and fits between end walls 14 and 15, and a pair of lugs 23 projected upwardly therefrom substantially midway between said walls and carry a pin 24. A shift lever 28 is mounted at its lower end on pin 24 and projects upwardly beyond the upper end of support 11. Sleeve 22 permits lateral movement of lever 28, while pin 24 permits longitudinal movement of said lever.

A pair of lever arms 32 and 33 are mounted on walls 12 and 13, respectively, within support 11 for longitudinal movement with lever 28. These lever arms are mounted on opposite sides of the shift lever, and arm 32 is mounted on pin 36 carried by wall 12, and arm 33 is mounted on pin 37 carried by wall 13. Pins 36 and 37 are preferably aligned, and they are preferably located above the pivots of lever 28, as clearly shown in FIGURE 3.

Lever arms 32 and 33 are provided at their upper ends with flanges 40 and 41 which extend towards each other. Flanges 40 and 41 are formed with opposed notches 44 and 45 opening out from edges 46 and 47 thereof which extend longitudinally of support 11. It is preferable to have edges 46 and 47 so close to each other that lever 28 must fit in either one of them.

It is desirable to provide means for normally keeping lever 28 in one of the notches 44 or 45, and in this example, it is kept in the latter notch. A spring 50 is provided for this purpose. This spring fits at its opposite ends on aligned pins 52 and 53 projecting towards each other from wall 12 and a lug 55, respectively. Lug 55 is fixed to and projects upwardly from sleeve 22. Spring 50 is compressed between this lug and wall 12 so that it urges the lug and, consequently, lever 28 towards wall 13, thereby normally keeping the lever in notch 45.

If desired, means may be provided in unit 10 for normally urging lever 28 into notch 44. In this example, a lug 60 projects upwardly from sleeve 22 on the side of lever 28 remote from lug 55. Lug 60 carries a pin 61 which is aligned with another pin 62 carried by wall 13. If it is desired to urge the shift lever into notch 44 instead of notch 45, spring 50 would be fitted on to pins 61 and 62.

Suitable means may be provided for mounting unit 10 on a suitable part of a motor vehicle. In this example, support 11 is provided with a mounting flange 66 at the upper edge of support wall 13, said flange having a plurality of holes 67 therein for receiving bolts 68. FIGURE 3 shows flange 66 bolted to the undersurface of the floor 70 of a motor vehicle, while lever 28 projects upwardly through a slot 71 in said floor.

FIGURE 1 diagrammatically illustrates a motor vehicle transmission 75 having standard shifting arms 76 and 77 at one side thereof, said arms being fixed to and depending from operating shafts 79 and 80 which project laterally from the transmission. When unit 10 is secured in a vehicle, the lower end of lever arm 32 is connected by a rod or link 82 to the lower end of shift arm 76, while the lower end of lever arm 33 is connected by a rod or link 84 to the lower end of shift arm 77. Thus, longitudinal swinging movement of lever arms 32 and 33 move shift arms 76 and 77, respectively, in the same directions to shift gears of transmission 75.

The operation of shifting unit 10 is very simple. The diagram of FIGURE 5 shows the shift positions of lever 28 for reverse, first, second and third gears.

Shift lever 28 is shown in the neutral position in FIGURES 1, 2 and 3. When it is desired to shift into first gear, lever 28 is swung to the left into notch 44 and drawn back to the first gear position. This moves lever arm 32 in the same direction. When notch 44 is out of alignment with notch 45, the shift lever can be released since it is retained in its notch 44 by the flange edge 47. When shifting into second gear, it is only necessary to move lever 28 forwardly since it will ride along flange edge 47 and spring 50 will urge it into notch 45 as soon as notch 44 comes into alignment therewith. Continued movement of the lever moves lever arm 33 forwardly until the second gear position is reached. Here again, the shift lever can be released since it cannot get out of notch 45 because of flange edge 46 and spring 50. Simple movement of lever 28 rearwardly shifts into third gear since spring 50 keeps the lever in notch 45 as lever arm 33 moves with the shift lever.

FIGURE 6 illustrates the shift arrangement when spring 50 is placed on pins 61 and 62 between lug 60 and wall 13. In this case, it is necessary to adjust the transmission shift arms 76 and 77 so that they project upwardly from their respective shafts 79 and 80.

A quick and easy shifting of shift lever 28 is one of the important advantages of this invention. Spring 50 ensures a quick and easy shift from first gear to second gear even though the shift lever moves forwardly and laterally during this operation. However, the spring accomplishes the lateral movement automatically. Furthermore, the gears may be shifted quickly and easily up into third or down into second without the driver having to do more than to move lever 28 rearwardly or forwardly since said lever is automatically retained in notch 45 during this action. Another important advantage is the fact that the shifting is done with very little movement of lever 28, and it is done very easily since said lever pivots about pin 24 at its lower end and engages flanges 40 and 41 just above said pivot pin so that a lever action takes place. In addition to this, the pivot pins 36 and 37 of arms 32 and 33 are located near the upper ends of said arms so that relatively little movement of these upper ends results in a magnified movement of the lower ends of the lever arms. However, the lever action of shift lever 28 enables this amplification of the lever arm movement to be easily done.

FIGURE 4 diagrammatically illustrates some of the advantages of shifting unit 10. When shift lever 28 is moved from position 1 to position 2, lever arm 32 moves about its pivot 36 to shift its lower end the distance 90. As lever 28 moves about its pivot 24 at this time, it applies suitable leverage to the upper end of arm 32. Broken line 92 indicates the distance lever 28 would have to move if it were pivoted at 36 to accomplish the movement 90 at its lower end. The movement of lever 28 would have to be more than its movement from position 1 to position 2 in unit 10. A standard gear shift lever 95 is shown in FIGURE 4, said lever being pivoted at point 24 and having a lower end 96 for connection to the transmission shifting mechanism. In order to get the shifting movement 90 at the lower end of standard lever 95, the upper end thereof would have to move to position 3, this movement being considerably greater than the movement of lever 28 between positions 1 and 2 in unit 10. FIGURE 4 illustrates clearly how a comparatively small movement of shift lever 28 accomplishes the shifting action, whereas a standard lever 95 would have to move a considerably greater distance. Even if arm 32 were extended upwardly, as indicated by number 92, it would have to move farther than lever 28 to accomplish the same shifting action. In addition to this, the present lever action of shift lever 28 would be lost, and the driver would have to exert more pressure on the upper end of the lever arm. Furthermore, in order to attain the shifting motion 90 with the same amount of movement of standard lever 95 as with lever 28, said standard lever would have to be pivoted at 98. As little or no leverage would be available, it would be difficult to shift the standard lever about this point 98.

The simple construction of unit 10 is obvious. In addition to this, the unit may be quickly and easily assembled, and conveniently mounted in a vehicle. Spring 50 prevents shift lever 28 from vibrating, as well as aiding in the shifting from first to second gears, and from second to third gears.

What I claim as my invention is:

1. Vehicle transmission shifting unit comprising a shift lever pivotally mounted for longitudinal and lateral movement with reference to a vehicle in which the unit is mounted, a pair of lever arms pivotally mounted one on each side of the shift lever for longitudinal movement, each lever arm having a lower end below its pivot adapted to be operatively connected to a transmission shifter, the pivotal mounting of each arm being above the pivotal mounting of the lever, and means for interengaging each arm with the lever for movement therewith when said lever is moved laterally towards the latter arm, said lever disengaging each lever arm when it is moved towards the other lever arm.

2. Vehicle transmission shifting unit as claimed in claim 1 in which each lever arm extends down below the pivotal mounting of the shift lever.

3. Vehicle transmission shifting unit comprising a shift lever pivotally mounted for longitudinal and lateral movement with reference to a vehicle in which the unit is mounted, a pair of lever arms pivotally mounted one on each side of the shift lever for longitudinal movement, each lever arm having a lower end below its pivot adapted to be operatively connected to a transmission shifter, the pivotal mounting of each arm being above the pivotal mounting of the lever, and a longitudinally-extending flange on each arm above the pivotal mounting thereof and extending towards the lever, the flange of each arm having a notch therein adapted to receive the lever arm to cause said arm to move with the lever, said lever leaving the notch of each arm when the lever is moved laterally towards the other arm.

4. Vehicle transmission shifting unit as claimed in claim 3 in which the lever arm flanges extend so far towards each other that the shift lever must be located in the notch of either flange.

5. Vehicle transmission shifting unit as claimed in claim 3 including resilient means bearing against the lever normally to bias it into the flange notch of one of the lever arms.

6. Vehicle transmission shifting unit as claimed in claim 3 in which each lever arm extends down below the pivotal mounting of the shift lever.

7. Vehicle transmission shifting unit comprising a support having opposed sides and open at the top and bottom thereof, support means within and carried by the support, a shift lever pivotally mounted at its lower end for lateral and longitudinal movement, with reference to a vehicle in which the unit is mounted, on said support means and extending upwardly beyond the top of the support, lever arms within the support and pivotally mounted one on each side of said support near the shift lever, each lever arm having upper and lower ends above and below its pivotal mounting, the pivotal mounting of each arm being above the pivotal mounting of the lever, the lower end of each of said arms being adapted to be operatively connected to a transmission shifter, and means for interengaging each arm near the upper end thereof with the lever for movement therewith when said lever is moved laterally towards the latter arm, said lever disengaging each lever arm when it is moved towards the other lever arm.

8. Vehicle transmission shifting unit comprising a support having opposed sides and open at the top and bottom thereof, support means within and carried by the support, a shift lever pivotally mounted at its lower end for lateral and longitudinal movement, with reference to a vehicle in which the unit is mounted, on said support means and extending upwardly beyond the top of the support, lever arms within the support and pivotally mounted one on each side of said support near the shift lever, each lever arm having upper and lower ends above and below its pivotal mounting, the pivotal mounting of each arm being above the pivotal mounting of the lever, the lower end of each of said arms being adapted to be operatively conencted to a transmission shifter, and each lever arm being formed with a notch at its upper end opening towards the notch of the other lever arm and adapted to receive the lever, said notches being positioned so that they are aligned when the transmission is in neutral.

9. Vehicle transmission shifting unit as claimed in claim 8 including resilient means normally urging the shift lever laterally into the notch of one of said lever arms.

10. Vehicle transmission shifting unit comprising a support having opposed sides and open at the top and bottom thereof, a shaft carried by and extending longitudinally of the support with reference to a vehicle in which the units is mounted, a sleeve mounted on said shaft and rotatable around the shaft axis, a shift lever pivotally mounted on said sleeve for longitudinal movement and extending upwardly beyond the top of the support, lever arms within the support and pivotally mounted one on each side of said support near the shift lever, each lever arm having upper and lower ends above and below its pivotal mounting and the pivotal mounting of the lever, the pivotal mounting of each arm being above the pivotal mounting of the lever, the lower end of each of said arms being adapted to be operatively connected to a transmission shifter, and means for interengaging the upper end of each arm with the lever above the lever pivotal mounting for movement with the lever when said lever is moved laterally towards the latter arm, said lever disengaging each lever arm when it is moved towards the other lever arm.

11. Vehicle transmission shifting unit comprising a support having opposed sides and open at the top and bottom thereof, a shaft carried by and extending longitudinally of the support with reference to a vehicle in which the unit is mounted, a sleeve mounted on said shaft and rotatable around the shaft axis, a shift lever pivotally mounted on said sleeve for longitudinal movement and extending upwardly beyond the top of the support, lever arms within the support and pivotally mounted one on each side of said support near the shift lever, each lever arm having upper and lower ends above and below its pivotal mounting, the lower end of each of said arms being adapted to be operatively connected to a transmission shifter, and a longitudinally-extending flange on each arm above the pivotal mounting thereof and extending towards the lever, the flange of each arm having a notch therein adapted to receive the lever arm to cause said arm to move with the lever, said lever leaving the notch of each arm when the lever is moved laterally towards the other arm.

12. Vehicle transmission shifting unit as claimed in claim 11 in which the lever arm flanges extend so far towards each other that the shift lever must be located in the notch of either flange.

13. Vehicle transmission shifting unit as claimed in claim 11 including resilient means bearing against the lever normally to bias it into the flange notch of one of the lever arms.

14. Vehicle transmission shifting unit as claimed in claim 11 in which the pivotal mountings of the lever arms are located above the pivotal mounting of the shift lever.

15. Vehicle transmission shifting unit as claimed in claim 11 in which each lever arm extends down below the pivotal mounting of the shift lever.

References Cited in the file of this patent
UNITED STATES PATENTS

| | | |
|---|---|---|
| 2,894,410 | Libby | July 14, 1959 |
| 3,022,678 | McCordic | Feb. 27, 1962 |
| 3,049,934 | Butler et al. | Aug. 21, 1962 |
| 3,052,135 | Hurst et al. | Sept. 4, 1962 |